United States Patent [19]

Woo

[11] 3,954,685

[45] *May 4, 1976

[54] SULFUR FOAM PRODUCT AND PROCESS

[75] Inventor: Gar Lok Woo, Tiburon, Calif.

[73] Assignee: Chevron Research Company, San Francisco, Calif.

[ * ] Notice: The portion of the term of this patent subsequent to June 3, 1992, has been disclaimed.

[22] Filed: May 10, 1974

[21] Appl. No.: 468,857

Related U.S. Application Data

[63] Continuation-in-part of Ser. Nos. 344,694, March 26, 1973, Pat. No. 3,892,686, and Ser. No. 438,508, Jan. 31, 1974, Pat. No. 3,887,504, said Ser. No. 344,694, is a continuation-in-part of Ser. No. 253,144, May 15, 1972, abandoned.

[52] U.S. Cl. .......................... 260/2.5 A; 260/2.5 R; 260/2.5 N; 260/2.5 AM; 260/2.5 AK; 260/2.5 BE; 260/18 TN; 260/30.8 R; 260/9; 260/37 N; 260/859 R

[51] Int. Cl.² .......................................... C08J 9/00

[58] Field of Search... 106/122, 287 SC; 260/2.5 AJ, 260/2.5 BB, 2.5 A, 2.5 AL, 2.5 AT, 260/2.5 AW, 30.8 R, 75 S, 79.5 NV

[56] References Cited
UNITED STATES PATENTS

| | | | |
|---|---|---|---|
| 3,222,301 | 12/1965 | Dahu | 260/2.5 BB |
| 3,494,966 | 2/1970 | Geering et al. | 260/2.5 R |
| 3,498,936 | 3/1970 | Wilson | 260/2.5 AP |
| 3,542,701 | 11/1970 | Von Roemsdouk | 260/2.5 AJ |
| 3,892,686 | 7/1975 | Woo | 260/2.5 A |

*Primary Examiner*—Morton Foelak
*Attorney, Agent, or Firm*—G. F. Magdeburger; John Stoner, Jr.; T. G. De Jonghe

[57] ABSTRACT

A process for producing a sulfur foam which comprises forming a sulfur system containing an aliphatic polysulfide and optionally molten elemental sulfur, contacting and reacting an acid with the sulfur system to obtain a sulfur system-acid adduct, said acid being capable of forming $CO_2$ or COS upon reaction with an isocyanate or isothiocyanate; and reacting polyisocyanate with the adduct to obtain sulfur foam.

Preferably the acids used in the preparation of the sulfur foam are carboxylic acids. The preferred aliphatic polysulfides include the liquid polysulfides derived by the reaction of sodium polysulfide with dichloroethyl ether and dichloroethyl formal.

16 Claims, No Drawings

SULFUR FOAM PRODUCT AND PROCESS

CROSS-REFERENCE TO RELATED APPLICATIONS

This application is a continuation-in-part of U.S. application Ser. No. 344,694, filed Mar. 26, 1973, now U.S. Pat. No. 3,892,686, issued July 1, 1975, which, in turn, is a continuation-in-part of U.S. application Ser. No. 253,144, filed May 15, 1972, now abandoned. This application is also a continuation-in-part of U.S. application Ser. No. 438,508, filed Jan. 31, 1974, now U.S. Pat. No. 3,887,504, issued June 3, 1975.

BACKGROUND OF THE INVENTION

The present invention relates to sulfur foams.

U.S. Pat. No. 3,337,355, issued to Dale and Ludwig, discloses the production of a sulfur foam using the following steps:
a. heating sulfur to above its melting point;
b. blending a stabilizing agent with the molten sulfur;
c. blending a viscosity increaser with the molten sulfur, steps (b) and (c) being taken in either order with respect to the other;
d. forming bubbles in the molten sulfur, and
e. cooling the molten sulfur to below its melting point.

Stabilizing agents disclosed include talcs, mica and plate-like particles. Viscosity increasers disclosed include phosphorus sulfide, styrene monomers and polysulfide liquids. According to U.S. Pat. No. 3,337,355:

"The forming of bubbles in the molten sulphur may be done in any conventional manner for forming foams generally such as those methods used in forming plastic foams. These include (1) mechanically mixing a gas such as air with the molten sulphur, (2) adding a blowing agent, and (3) mixing a liquid with the molten sulphur while maintaining a predetermined pressure on the sulphur and then releasing the pressure on the sulphur sufficiently that the liquid will vaporize at the temperature and lower pressure involved. All of these methods must use material free from substances having a deleterious effect upon the process. For example, most members of the halogen family will decrease the viscosity of the sulphur sufficiently that proper foams will not be formed. Examples of blowing agents that are satisfactory are a combination of sodium carbonate or bicarbonate and acid, N,N'-dimethyl N,N'-dinitrosoterephthalamide sold under the trade name Nitrosan, sodium bicarbonate dispersed in a neutral oil sold under the trade name Unicel S, and N,N'-dinitrosopentamethylenetetramine sold under the trade name Unicel ND. Nitrosan, Unicel S, and Unicel ND are products of E. I. du Pont de Nemours & Co."

According to the examples in U.S. Pat. No. 3,337,355, typical ingredients for the sulfur foam include sulfur, talc, $P_2S_5$, calcium carbonate and phosphoric acid.

By retrospect in view of the present invention, art in the area of polyurethane foams can also be referred to by way of background. As indicated in Kirk-Othmer Encyclopedia of Chemical Technology (1965), Vol. 9, p. 853, the chemical ingredients of a urethane foam are a polyfunctional isocyanate (1) and a hydroxyl-containing polymer (2) along with catalysts to control the rate and type of reaction and other additives to control the surface chemistry of the process. A number of competing reactions can occur when (1) and (2) are brought together, but the main product, shown in the equation below, is a urethane (3).

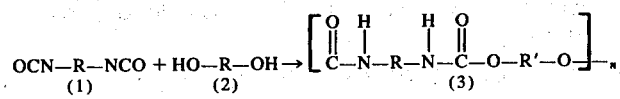

Originally, carbon dioxide was generated in situ (by the reaction of isocyanate with water) as a blowing agent for both rigid and flexible polyurethane foams. U.S. Pat. No. 2,814,600 discloses production of polyurethane foams by reaction of isocyanate groups with water to release carbon dioxide.

It is said to still be the common practice today to rely largely on reaction of water with isocyanate as a method for gas generation for flexible materials. Rigid cellular polyurethanes are now typically produced using volatile liquids, usually fluorocarbons, which act as expanding agents, producing gas on heating the foaming mixture.

Although it is not the typical method used to make polyurethane foams, it has been disclosed to react carboxylic acid groups with isocyanate groups to form amide bonds and release carbon dioxide. See, for example, Saunders and Frisch, Polyurethanes, Part I, Interscience Publishers (1962) at p. 79, and U.S. Pat. No. 2,890,181.

U.S. Pat. No. 3,222,301 discloses polyurethane foams containing a small amount of dissolved sulfur to prevent discoloration of the polyurethane foam. As can be seen from the examples of U.S. Pat. No. 3,222,301, only a very small amount of sulfur is included in the final foam; one of the reactants for formation of the foam can pick up the necessary small amount of sulfur by filtering the reactant through finely divided sulfur prior to using the reactant to form the foam.

U.S. Pat. No. 3,542,701 discloses the use of sulfur in various foams, including polystyrene foams as well as polyurethane foams, to decrease the inflammability of the foam. According to U.S. Pat. No. 3,542,701, "The total amount of elementary sulfur in the foam or other cellular structure may be as high as slightly under 50% by weight". The process of U.S. Pat. No. 3,542,701 is stated to be: " .... applicable to all foams or other cellular or porous structures of combustible synthetic macromolecular substances, without exceptions, although the best results are obtained with substances, which at the temperatures applied in the preparation of the foams or other cellular or porous structures of these substances hardly react with sulfur if at all."

U.S. Pat. No. 3,494,966 discloses a method for preparing: (1) phenolic polyol in which hydroxy-substituted phenolic rings are directly linked by sulfur linkages of preferably less than about 2 sulfur atoms; (2) aliphatic polyol derivatives of the phenolic polyol; and (3) polyurethanes from the aliphatic polyols. U.S. Pat. No. 3,498,936 is largely similar to U.S. Pat. No. 3,494,966 in its disclosure.

U.S. Pat. No. 3,706,680 discloses polyurethanes prepared from diphenols and polyisocyanates. According to U.S. Pat. No. 3,706,680, the diphenols used contain a connecting R radical which is an alkylidene radical containing from about 1 to 8 carbon atoms, sulfur, disulfide, sulfur oxide, or sulfur dioxide.

U.S. Pat. Nos. 2,814,600, 3,095,387, 3,114,723 and 3,505,251 disclose methods of preparing blown or foamed polysulfide polymers using as foaming agents for production of gas such materials as polyisocyanate and water (−600), sodium azidodicarboxylate (−387), hydrazine-type compound (−723) and dimercaptans and lead peroxide (−251).

SUMMARY OF THE INVENTION

According to the present invention, a process is provided for producing a sulfur foam which comprises contacting and reacting an organic protonic acid with an aliphatic polysulfide to obtain a polysulfide-acid adduct, said acid being capable of forming $CO_2$ or COS upon reaction with an isocyanate and reacting a polyisocyanate or a polyisothiocyanate with the adduct to obtain a sulfur foam.

The organic protonic acids used are limited to those acids reactive with aliphatic polysulfides or with molten sulfur to form a polysulfide-acid adduct or a sulfided acid, respectively. The sulfided acid reacts with an aliphatic polysulfide to produce a polysulfide-acid adduct. The polysulfide-acid adduct may be prepared by the simultaneous reaction of aliphatic polysulfide, sulfur and organic protonic acid, i.e., an "in-situ" preparation of a sulfided organic acid.

In a preferred mode of operation, a process is provided for producing a sulfur foam containing at least 50 weight percent sulfur, which comprises forming a sulfur system by mixing molten elemental sulfur and an aliphatic polysulfide; contacting and reacting an acid with the sulfur or aliphatic polysulfide of the sulfur system to obtain a sulfur system-acid adduct, said acid being capable of forming $CO_2$ or COS upon reaction with an isocyanate; and reacting a polyisocyanate or polyisothiocyanate with the adduct to obtain sulfur foam.

Among other factors, the present invention is based on my finding that foams containing large amounts of sulfur can be quite successfully made from sulfur, an aliphatic polysulfide, an acid and a polyisocyanate or polyisothiocyanate. Various types of foams can be produced by the process of the present invention, and in particular, excellent flexible foams can be produced by the process of the present invention.

Critical aspects of the present invention include the use of an organic acid which reacts with the sulfur of the aliphatic polysulfide and reacts so as to leave unreacted protonic acid group(s). The total sulfur content of the foams in accordance with the present invention is usually above 50%, preferably above 60%, and more preferably above 70% by weight. Hence the foams can be referred to as "sulfur-based foams".

Preferred acids used in the process of the present invention are $C_2$–$C_{10}$ mercapto carboxylic acids, dithiodicarboxylic acids, and $C_3$–$C_{10}$ linear unsaturated acids such as acrylic acid. The unsaturated acids are especially preferred when sulfur is added to the polysulfides.

The foams of the present invention are generally prepared by: (1) heating and reacting an organic acid and an aliphatic polysulfide at temperatures in the range 100° to 200°C. to form a polysulfide-acid adduct; (2) adding a polyisocyanate or polyisothiocyanate to this adduct to form a foam.

In a preferred mode of operation, the general steps used in making the sulfur foams include:
a. melting elemental sulfur at about 120°–200°C.;
b. mixing the molten sulfur with an aliphatic polysulfide to obtain a sulfur system;
c. mixing and reacting an acid with the sulfur system to obtain a sulfur system-acid adduct which is also called a modified foam precursor (MFP); and
d. adding a polyisocyanate or polyisothiocyanate to the modified molten foam precursor to generate foam.

Exemplary aliphatic polysulfides are the reaction product of sodium polysulfide with 1,2-dichloroethane, 2,2'-dichlorodiethyl ether, or 2,2'-dichloroformal.

Step (b) can comprise the mixing of the molten sulfur with an organic acid to produce a sulfided acid; and step (c) can comprise mixing and reacting an aliphatic polysulfide with the sulfided acid to form the MFP.

In any case, the acid is reacted with the sulfur of the aliphatic polysulfide, and it is reacted so as to leave unreacted protonic acid groups. Thus, the acids used in the present invention are limited to those which function to react with the sulfur of the aliphatic polysulfide and so as to leave unreacted protonic acid group(s), preferably unreacted carboxylic acid group(s).

Exemplary acids which can be used to produce the modified foam precursor include monocarboxylic acids such as acrylic acid, mentioned previously, or a dithio acid such as dithiodipropionic acid. The modified precursor can at this point be cooled to a solid and stored or shipped, and then subsequently remelted and used in accordance with step (d).

Exemplary isocyanates which can be used in step (d) include p,p'-diphenylmethanediisocyanate or toluene diisocyanate.

Upon adding the isocyanate foaming agent to the modified foam precursor material, foam is formed, so that a controlled, short residence time is desirable for mixing the isocyanate with the modified foam precursor. Preferred residence times are within about 5–180, preferably 10–120, seconds. Thus, the isocyanate and molten, modified foam precursor can be mixed in a pump and discharged through a line, allowing a residence time of about 10–120 seconds. Residence times are dependent on the particular material used and the particular temperatures.

Preferably a surfactant such as the nonionic silicone surfactants used in the urethane foam art is also used. Such surfactants are generally copolymers of a polysiloxane and one or more oxyalkylene polymer chains.

The present invention contemplates foam products prepared in accordance with the methods described herein.

The term "foam" is used herein to mean a cellular material containing a gas in the cells. When initially formed, the foam may be finely divided gas bubbles in liquid, but after cooling the foam becomes a flexible or rigid solid containing gas bubbles. Flexible foams are particularly advantageously produced by the process of the present invention, and generally are obtained using the aliphatic polysulfide reactant.

The organic protonic acids which can be used are those compounds capable of ionizing to produce a proton and an anion in which the group having the negative charge has at least two oxygen atoms, such as carboxylic acids, sulfonic acids, phosphoric acids, acidic esters of polybasic inorganic acids, and the like. Carboxylic acids are preferred.

The acids useful in the formation of the foam products of this invention are those acids which are soluble in the liquid polysulfide or are liquid at reaction conditions, i.e., melt below 250°C. It is preferred that the acids have a boiling point above 100°C., preferably above 140°C., and melt below 200°C.

The quantity of acid to be incorporated varies from 0.001 to 1.0, preferably 0.005 to 0.15, g-mol acid equivalents per 100 g of sulfur. When the foaming agent is $CO_2$ resulting from an acid/isocyanate reaction, the higher levels of acid concentration give foams of low bulk density; whereas the lower levels result in foams of high bulk density. It should be recognized that higher quantities of acid may be reacted with the aliphatic polysulfide to form a concentrated polysulfide-acid adduct, and then this adduct can be diluted with additional aliphatic polysulfide and/or sulfur to given a final acid concentration within the above ranges.

Thus, in more detail and in accordance with a preferred embodiment of the present invention, a sulfur foam is produced by contacting sulfur and a liquid organic polysulfide, at a temperature in the range of about 100° to 200°C. with from about 1 to 15 weight percent of an acid compound as disclosed in Ser. Nos. 253,144 and 344,694.

ACIDS

Exemplary acids include sulfur-containing acids such as dithiodipropionic acid, dithioglycolic acid, mercaptoacetic acid, 3-mercaptopropionic acid, 1,2-dithiane-3,6-dicarboxylic acid, 1,2-dithiolane-4-carboxylic acid, 6,8-thioetic acid, p-mercaptobenzoic acid, mecaptophenylacetic acid, etc.; unsaturated monocarboxylic acids such as acrylic acid, oleic acid, methacrylic acid, monoesters of maleic or fumaric acid (methyl fumarate), monoallyl esters of dibasic acids (allyl succinate, allyl adipate), etc.; unsaturated polycarboxylic acids having at least 5 carbon atoms such as 2-pentene-1,5-dicarboxylic acid, 4-octene-1,8-dicarboxylic acid, 3-hexene-1,6-dicarboxylic acid, acid-esters formed by the reaction of an unsaturated dibasic or polybasic acid and a polyhydric alcohol or monoesters of a saturated polybasic acid and an unsaturated polyhydric alcohol (trimethylolpropanetrimaleate), etc; and saturated acids which in the presence of molten sulfur are converted to sulfurized acids such as palmitic acid, stearic acid, hexane carboxylic acid, various naphthenic acids, etc.

Among the useful sulfonic acids are hexane sulfonic acid, dodecylbenzene sulfonic acid, β-hydroxyoctane sulfonic acid, 3-hexene sulfonic acid, etc. Among other useful acids are octadecylbenzeneboronic acid, vinylbenzene boronic acid, 3-pentenylphosphinic acid, dihexylphosphinic acid, dicrotyl hydrogen phosphate, the cyclic diesters of boric acid, saturated and unsaturated cis-1,2- and 1,3-diols, etc.

The organic carboxylic acids are particularly preferred, especially monoolefinic carboxylic acids having from 3 to 30, preferably from 3 to 15, carbon atoms. In this connection, it can be noted that some saturated acids will be satisfactory for use in the present invention. For example, if a saturated acid such as hexadecanoic acid is heated with sulfur, hydrogen sulfide is evolved and the hexadecanoic acid is dehydrogenated to form an unsaturated acid, which is then further transformed into a sulfurized acid. Unsaturated acids are preferred reactive acids for forming the sulfur-acid adduct. The unsaturated acids are believed to react with the molten sulfur principally at the double (or triple) carbon-carbon bond. Dithio organic acids are believed to react with the molten sulfur at the sulfur-sulfur bond of the dithio acid. In any case, in accordance with the present invention, the organic acid must react with the sulfur to form a sulfur-organic acid adduct containing protonic acid groups.

Preferably the unsaturated, dithio or mercapto acids used in the process of the present invention have from 2 to 30 carbon atoms. Particularly preferred organic acids for use in the process of the present invention include acrylic acid, dithiodipropionic acid, 3-mecaptopropionic acid, 2-mercaptobenzoic acid, methacrylic acid and 2-mercaptoacetic acid.

Exemplary preferred unsaturated carboxylic acids for use in the present invention generally include acids of the formula

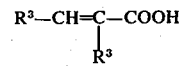

wherein $R^3$ is H or hydrocarbyl of 1 to 18 carbon atoms.

The reaction of the sulfur system with the acid is generally complete in a period of from about 1 minute to 10 hours, usually 5 minutes to 1 hour.

The modified foam precursor is then foamed preferably by mixing it with a polyisocyanate compound of the formula $R^5(NCX)n$ in which $R^5$ is a polyvalent organic radical, X is oxygen or sulfur, and n is an integer of at least 2, and allowing the mixture to cool below its softening point. The isocyanate is employed in sufficient quantity to provide a sufficient number of isocyanate groups to react with at least 10%, preferably 50% and most preferably with about 100% of the acid groups present.

In another embodiment of the invention, from 0.01 to 50, preferably from 0.1 to 25, parts of elemental sulfur for each part of the liquid polysulfide is combined with the polysulfide and heated at a temperature of 100° to 200°C. for a period of from 1½ to 6 hours. While the addition of more sulfur than about 15 parts/part of polysulfide will result in the loss of a certain amount of flexibility of the final product, it has been found that for many purposes sufficient flexibility is retained to provide shock absorption, etc., even at this high sulfur level. It is preferred that from ½ to 10 parts of sulfur be employed for each part of the liquid polysulfide. While it is preferred that the sulfur and polysulfide be combined before addition of the acid of step A), it is also possible to introduce additional sulfur with the acid compound or after the acid is introduced. Occasionally it is desirable to pre-react the sulfur and acid by heating them above 120°C. for ¼ to 10 hours prior to mixing with the sulfur system.

When more than about 2 parts by weight of sulfur relative to the liquefied polysulfide is employed, it is preferred that a stabilizer such as talc be introduced into the formulation.

Examples of organic polysulfides which can be employed in the present invention are described in "Polysulfide Polymers", E. M. Fetter and J. S. Jorczak, "Industrial and Engineering Chemistry," November 1950, at pages 2217–23. Preferred polysulfides are aliphatic disulfides, trisulfides, and tetrasulfides (usually the disulfide) which can be produced by the reaction of a sodium polysulfide, such as sodium disulfide, etc., with an organic, usually an aliphatic, dihalide. Among the halides which have been employed are methylene dichloride, ethylene dichloride, propylene dichloride, glycerol dichlorohydrin, epichlorohydrin, dichloroethyl ether, dichloromethyl formal, dichloroethyl formal, and triglycol dichloride. The reactants may include minor amounts of trifunctional or tetrafunctional halides, the presence of which will cause cross-linking and increase the viscosity of the resulting polymers. Usually not more than about 10%, preferably about 2%, cross-linking is preferred.

Particularly preferred materials are those which are termed polysulfide liquid polymers marketed by the Thiokol Corporation under the designations LP-2 and LP-3. These liquid polymers generally have thiol end groups and molecular weights in the range of from about 500 to 10,000, usually about 1000 to about 8000. The polysulfide materials are also described as polyalkylenepolysulfides, or polythiomercaptans, or where the dihalide monomer is predominantly ether and/or formal, etc., a polyoxyalkylenepolysulfide. For the purposes of this invention, the particular structures of the liquid polysulfide is of little importance, i.e., the degree of cross-linking and character of the terminal groups, so long as there are present the polysulfide groups to allow introduction of the reactive carboxyl units into the structure. The terminal thiol groups can also react with the carboxylic acids to introduce reactive carboxylic units into the structure.

Certain dicarboxylic acids are not preferred because they tend to form anhydrides or because they tend to be insoluble in the mixture. Such acids include fumaric, maleic and terephthalic acids.

POLYISOCYANATES

The organic polyisocyanates which can be employed include aromatic and aliphatic as well as heterocyclic materials. Examples of suitable aromatic materials include tolylene 2,4-diisocyanate, polymethylene polyphenyl isocyanate (polymeric material made by Upjohn), bitolylene diisocyanate, dianisidene diisocyanate, triphenylmethane diisocyanate, and 3,3'-dichloro-4,4'-diphenylene diisocyanate. The aliphatic and cycloaliphatic materials which may be employed include such materials as hexamethylene diisocyanate, cyclohexylene-1,2-diisocyanate, etc. The isothiocyanate analogs of these materials may be employed, examples of which include butylene-1,2-diisothiocyanate and para-phenylene diisothiocyanate.

Another type of polyisocyanate useful for this invention is the so-called prepolymer adducts of a polyhydroxy, polythiol or polyamino compound and excess polyisocyanate, for example, the product consisting of one mol of polyethylene glycol and two mols of toluene diisocyanate. In general, the pre-polymers have the formula:

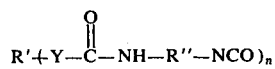

wherein R' is the nucleus of a polyhydric compound having n hydroxy groups, R'' is a diradical, Y is O, S, or NR''', R''' is H or low-molecular-weight alkyl group or an aryl group, and n has a value of 2 to 6. Typical compounds include the reaction product of toluene diisocyanate with diethylene glycol, of p,p'-diphenylmethane diisocyanate with trimethylolpropane, of m-xylylene diisocyanate with decane 1,10-diol, of toluene diisocyanate with the adduct of trimethylol propane and propylene oxide, etc. The preferred polyisocyanates are aromatic diisocyanates having boiling points higher than 130°C. and are soluble or liquid at reaction conditions.

SURFACTANTS

Conventional surfactants which are used to stabilize plastic foams can be used in the preparation of the foams of this invention. Commonly employed surfactants are described in "Plastic Foams," Vol. I, C. S. Benning, Interscience Publishers, 1963, at page 183 and pages 488–91 and in "Polyurethane Technology," Bruns, Interscience Publishers, 1969, pages 50–53.

The most effective of the surfactants in foam production are the organosilicones, an example of which is Dow Corning DC-193, which is a silicone-glycol copolymer. Surfactants commonly used for flexible polyurethane foams are preferred when high flexibility is desired. Other surfactants which have been described as being useful in foam stabilization include diisobutylene alkylated phenol and polyoxymethyltridecyl ether. From about 0.1 to 5% by weight of the surfactant may be employed.

PREPARATION OF THE FOAMS

Addition of the acid and its reaction with the liquid organic polysulfide and/or sulfur will generally take from about 1 minute to 4 hours, typically from about 5 minutes to 2 hours.

This product can be cooled and stored for use at a later time or it may be reacted immediately with the organic polyisocyanate or polyisothiocyanate in order to produce a foamed material.

Temperature during the isocyanate addition will generally be maintained between about 80° and 180°C., preferably between 90° and 140°C. Since the reaction is carried out when the material is molten and generally above 90°C., it is not necessary to employ the conventional materials which are used to accelerate the reaction between polyisocyanates and active hydrogen-containing resins. However, these materials can be employed, if desired. Reaction with the isocyanate can be accomplished in the original reaction vessel or in another suitable vessel from which the foam can be poured out and placed in molds, onto moving belts, etc., before cooling.

Another optional ingredient is a solid stabilizer, which is defined as finely divided, inert material having individual particles which are plate-like in form. Examples include talc, mica, carbon black, aluminum pigment, kaolin, etc. This ingredient is usually added to the molten-sulfur mixture just before the cross-linking agent(s) is added. When used, the quantity of stabilizer varies from 1 to 15 parts per 100 parts of sulfur. Preferably the stabilizer is added prior to the addition of the isocyanate.

In addition to, or in place of, the previously described additives, in certain applications it is desirable to add to the foam compositions other nonplate-like materials, typically those which have been employed as fillers in plastic foams. Materials of this type are described in "Plastic Foams," Vol. I, Calvin James Banning, Wiley-Interscience, 1969. Examples of such fillers include wood-derived materials such as wood flour, resins, and synthetic fibers such as nylon acrylics and polyesters, inorganic salts and oxides such as heavy metal oxides to modify electrical properties, silica and various silicates, etc. Another group of materials which can be used to modify physical properties of the foams are the inorganic flakes and fibers represented by glass fiber, mica and asbestos fillers, etc. Such fillers are employed at concentrations in the range of about 1 to 15 parts per 100 parts of sulfur, depending on the viscosity or thixotropic property of the final material. The above stabilizers and additives are particularly useful and important for getting good cell-structure foam when the amount of cross-linking is low.

It is also within the scope of the present invention to use the additives, catalysts, surfactants, retarders, and other modifiers recognized in the isocyanate art.

The following examples illustrate the practice of this invention.

EXAMPLES

EXAMPLE 1

Preparation of Flexible Foam by Reaction of Polyisocyanate with an Acrylic Acid-Modified Aliphatic Polysulfide A 50-g portion of liquid polysulfide (Thiokol LP-3), a commercially available liquid polysulfide having an average molecular weight of about 1000 and an average mercaptan content of about 6.6%, was shaken well with 3.5 g of acrylic acid in a capped bottle. The material was let stand overnight at room temperature.

The mixture was then heated at a temperature of about 80–90°C. for 6 hours and cooled to room temperature. To a 5-g portion of the product were added 0.1 g of DC-193 silicone surfactant and 2.2 g of MONDUR MR (a mixture of polyisocyanates and diphenylmethane diisocyanate). The mixture was stirred with a spatula. The mixture was placed on a hot plate and heated to 40°C.; foaming began. The material was placed in a 130°C. oven, and it foamed up to 45 mls. When it was taken from the oven, the foam rapidly collapsed. It was put back in the oven for about 15 minutes, and it foamed again, up to about 20 mls. The material was taken out and cooled to room temperature, giving a very rubbery flexible foam.

EXAMPLE 2

Preparation of Flexible Foam by Reaction of Polyisocyanate with Dithiodipropionic Acid-Modified Aliphatic Polysulfide A 60.3-g portion of liquid organic polysulfide (Thiokol LP-32), which has an average molecular weight of about 4000 and a mercaptan content of 1.75%, and 3.0 g of dithiodipropionic acid were heated in a beaker to a temperature of about 150°C. The mixture was stirred at 150°–170°C. for 2 hours.

To 33.2 g of the product obtained above was added 0.3 g of triethylene diamine and 0.3 g DC-193 surfactant. The mixture was heated to 110°C., was mixed well and cooled to about 90°C. To the mixture was added 3.0 g of tolylene 2,4-diisocyanate. The material was rapidly mixed, and it foamed to a volume of about 120 ml. After allowing to set for 2 hours at room temperature, it was placed in a 130°C. oven for 20 minutes. It foamed up to about 270 ml. The product was a flexible material.

EXAMPLE 3

Preparation of Flexible Foam from Aliphatic Polysulfide and Additional Sulfur

A. A 150-g portion of Thiokol LP-32, employed in Example 2, and 300 g of elemental sulfur were heated gradually with mixing to a temperature of about 145°C. over 1½ hours. The mixture, which was cloudy at first, became clear, and heating was continued at 145°–150°C. for 30 minutes. 14.7 g of acrylic acid was added to the solution, and it was stirred at a temperature of 145°–150°C. for 50 minutes.

B. A 52-g portion of the product of (A) was placed in a 250-ml, preheated plastic cup. The temperature was about 135–140°C. To the material was added 0.5 g of DC-193 silicone surfactant. The mixture was rapidly stirred and 4.5 g of MONDUR MR, preheated to a temperature of about 80°–90°C. was added, stirred rapidly and left in a 110°–120°C. oven for 3 minutes. The material foamed up to about 275 ml, and when cooled was a very strong, elastic foam.

C. To a 50-g portion of the product of (A) at a temperature of 135°C. was added 1 g of carbon black and 0.4 g of DC-193 silicone surfactant. The material was mixed well. While still at a temperature of 135°C., 3.4 g of MONDUR MR was added with stirring. Upon foaming in a 110°–120°C. oven, a volume of about 250 ml of very flexible foam was formed.

EXAMPLE 4

Preparation of Sulfur-Aliphatic Polysulfide Foam with the Incorporation of Additional Hydroxyl Group A. A 2-liter flask equipped with condenser, thermometer and dropping funnel was charged with 1240 g of sulfur, which was then heated to 150°C. Acrylic acid (414 g) was added over a period of one hour. The resulting mixture was stirred at 145°–158°C. for 4 hours. At the end of this time, the viscous liquid was cooled and solidified.

B. A 25.4-g portion of the product of (A), 40 g of Rocure-7, a liquid polyoxyalkylene polysulfide produced by Fikes Chemical Company, and 127.6 g of sulfur were mixed cold and gradually heated to about 80°C. At this point, 7.0 g of 1,3-dimercapto-2-propanol was added with stirring. Hydrogen sulfide evolution occurred. The mixture was heated to 150°C. and stirred at a temperature of 150°–155°C. for 1½ hours.

C. To a 100-g portion of the product of (B) at a temperature of about 140°C. there was added, with stirring, 0.3 g of DC-193 silicone surfactant. A 12.0-g portion of MONDUR MR was added. The mixture was placed in a 140°C. oven for 10 minutes and a 90°C. oven for ½ hour. About 600 ml of fine-celled, hard, strong — but still flexible — foam was obtained.

EXAMPLE 5

Preparation of an Aliphatic Polysulfide Foam with the Incorporation of Additional Hydroxyl Groups A. A 125-ml Erlenmeyer flask was charged with 90 g of LP-32, 5 g of dithiodipropionic acid, 6.5 g of bis-(2-hydroxyethyl) disulfide and 0.5 g of sulfur. This mixture was heated and stirred at 170°C. for 1 hour under an atmosphere of nitrogen. It was then cooled to 20°C.

B. To 13 g of the above mixture at 40°C there was added a trace of triethylenediamine and 2.6 g of MONDUR MR. The mixture was stirred well and placed in an oven at 100°–120°C. for ½ hour. The resulting foam had a volume of 60 ml.

C. To 51 g of the product from (A) in a 125-ml plastic cup was added 0.4 g of DC-193 silicone surfactant. After stirring, the mixture was heated to 110°C. Then 9.4 g of MONDUR MR was added. The mixture was well stirred. Foaming occurred immediately to give a very good, flexible foam having a volume of about 300 ml.

EXAMPLE 6

Preparation of Flexible Foam from Aliphatic Polysulfide, Additional Sulfur, and Polypropylene Filler A. A 500-ml flask was charged with 60 g of LP-32 and 340 g of hot, molten sulfur. This mixture was heated at 150°–160°C. for 4 hours. Then 18 g of acrylic acid was added and the mixture was stirred at 145°–155°C. for 1 hour.

B. To 150 g of the above hot product in a 32-oz paper cup there was added 1.03 g of DC-193 and 8.21 g of MONDUR MR. The resulting mixture foamed immediately to 600 ml in volume. The foam was very rubbery, and after curing overnight it was still a good, flexible foam.

C. Sulfur (150 g) was added to 268 g of the product from (A). The resulting mixture was heated and stirred for ½ hour at about 140°C.

D. To 150 g of (C) there were added 1.07 g of DC-193 surfactant and 8.22 g of MONDUR MR polyisocyanate. The mixture was well stirred and then poured into a cardboard-carton mold. This mold was then placed in an oven, where foaming occurred. The resulting product was a flexible foam.

E. To 150 g of (C) there were added 7.5 g of polypropylene powder, 1.04 g of DC-193 and 8.17 g of MONDUR MR. The resulting flexible foam occupied 500 ml.

The foams which are prepared by the processes of this invention are flexible, strong, and substantially odor-free. They may be employed in a variety of applications wherein such characteristics are needed. Thus, they are particularly effective in the formation of protective packing surfaces around sensitive equipment and other articles which are subject to breakage in transit. They likewise can be used for formation of pillows, mattresses, etc. They also may be molded into appropriate shapes and employed as crash barriers for highway use.

The polysulfide rubber composition may also include othe compounding ingredients such as carbon black, titanium dioxide, clays or other fillers as well as other compounding ingredients normally employed in the formation of liquid polysulfide polyers. Incorporation of other polymeric substances such as epoxy resins, butadieneacrylonitrile polymers, phenolic resins, rubber latex, and so forth, may be desirable to impart special properties to the product. Combinations of different types of polysulfide rubbers will present advantages in certain applications.

What is claimed is:

1. A process for producing a sulfur foam which comprises (a) forming a sulfur system containing an aliphatic polysulfide; (b) contacting and reacting an organic protonic acid with the sulfur of the aliphatic polysulfide to obtain a sulfur system-acid adduct having unreacted acid groups, said acid being capable of forming $CO_2$ or COS upon reaction with an isocyanate, and (c) reacting polyisocyanate or polyisothiocyanate with said unreacted acid groups to liberate $CO_2$ or COS and obtain sulfur foam.

2. A process in accordance with claim 1 wherein elemental sulfur is added to the sulfur system before reacting the sulfur system with the acid.

3. A sulfur-based foam formed by the steps of
   a. reacting at a temperature in the range of about 100 to 200°C. an aliphatic polysulfide with from about 0.005 to 0.15 g-mol acid equivalent per 100 g of the polysulfide of an organic protonic acid which is reactive with the sulfur of the polysulfide so as to incorporate the acid with the polysulfide and form a sulfur system containing unreacted protonic acid groups, and
   b. reacting unreacted protonic acid groups of the sulfur system at a temperature in the range of 110°–160°C. with a polyisocyanate or polyisothiocyanate to release $CO_2$ and thereby form the foam.

4. A foam in accordance with claim 3 wherein elemental sulfur is blended at a temperature above about 120°C. with the aliphatic polysulfide before reacting the sulfur system with the acid.

5. A foam in accordance with claim 3 wherein the acid is an unsaturated carboxylic acid of the formula

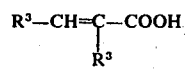

wherein $R^3$ is H or hydrocarbyl of 1 to 18 carbon atoms.

6. A foam in accordance with claim 5 in which $R^3$ is H.

7. A foam in accordance with claim 3 in which the acid is dithiodipropionic acid.

8. A foam in accordance with claim 3 in which the acid is dithiodiacetic acid.

9. A foam in accordance with claim 3 in which the acid is β-mercaptopropionic acid.

10. A foam in accordance with claim 3 in which the isocyanate employed in Step (b) is aromatic.

11. A foam in accordance with claim 10 in which the compound employed in Step (b) is diphenylmethane diisocyanate.

12. A foam in accordance with claim 10 in which the compound employed in Step (b) is tolylene diisocyanate.

13. A foam in accordance with claim 3 in which the liquid polysulfide has a molecular weight from about 500 to 10,000.

14. A foam precursor prepared in accordance with steps (a) and (b) of claim 1, which precursor will form a foam on adding the isocyanate in accordance with step (c) of claim 1.

15. A foam precursor prepared in accordance with step (a) of claim 3 which will form a foam upon adding the isocyanate in accordance with step (b) of claim 3.

16. A foam precursor prepared in accordance with step (a) of claim 3 wherein the acid is acrylic acid and wherein the precursor will form a foam upon adding the isocyanate in accordance with step (b) of claim 3.

* * * * *